(12) United States Patent
Srinivasa

(10) Patent No.: US 7,570,809 B1
(45) Date of Patent: Aug. 4, 2009

(54) METHOD FOR AUTOMATIC COLOR BALANCING IN DIGITAL IMAGES

(75) Inventor: Narayan Srinivasa, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 695 days.

(21) Appl. No.: 10/884,828

(22) Filed: Jul. 3, 2004

(51) Int. Cl.
*G06K 9/00* (2006.01)

(52) U.S. Cl. ........................... 382/167; 382/162

(58) Field of Classification Search ................ 382/167, 382/162, 164, 165; 706/4, 5, 7
See application file for complete search history.

(56) References Cited

U.S. PATENT DOCUMENTS

| | | | |
|---|---|---|---|
| 5,231,504 A | 7/1993 | Magee | |
| 5,384,601 A * | 1/1995 | Yamashita et al. | 348/577 |
| 5,396,579 A * | 3/1995 | Koji et al. | 706/5 |
| 5,504,524 A | 4/1996 | Lu et al. | |
| 5,548,697 A * | 8/1996 | Zortea | 706/2 |
| 6,272,239 B1 * | 8/2001 | Colla et al. | 382/167 |
| 6,388,648 B1 | 5/2002 | Clifton et al. | |
| 6,417,863 B1 | 7/2002 | Smith | |
| 6,744,544 B1 * | 6/2004 | Nagashima et al. | 358/518 |
| 7,180,629 B1 * | 2/2007 | Nishio et al. | 358/1.9 |
| 2004/0052414 A1 * | 3/2004 | Schroder | 382/167 |
| 2006/0013478 A1 * | 1/2006 | Ito et al. | 382/167 |
| 2007/0002159 A1 * | 1/2007 | Olsen et al. | 348/335 |

OTHER PUBLICATIONS

E. H. Land and J. J. McCann, "Lightness and Retinex theory," Journal of Optical Society of America, vol. 61, No. 1, pp. 1-11, Jan. 1971.
B. K. P. Horn, "Determining lightness from an image," Computer Graphics and Image Processing, vol. 3, No. 1, pp. 277-299, Dec. 1974.
G. Buchsbaum, "A Spatial Processor Model for Object Color Perception," J. Franklin Institute, vol. 310, pp. 1-26, 1980.
H. C. Lee, "Method for Computing these Scene-Illuminant chromaticity from specular highlights," Journal of Optical Society of America, vol. 3, pp. 1604-1699, 1986.
L. T. Mahoney and B. A. Wandell, "Color constancy: a method for recovering surface spectral reflectance," Journal of Optical Society of America, vol. 3, No. 1, pp. 29-33, Jan. 1986.

(Continued)

*Primary Examiner*—Samir A. Ahmed
*Assistant Examiner*—Stephen R Koziol
(74) *Attorney, Agent, or Firm*—Tope-McKay & Assoc.

(57) ABSTRACT

The present invention provides an automatic color balancing method for digital images by essentially performing adaptive weighting of surface reflectance and illuminant spectra components of the image. The adaptive weighting mechanism is derived from fuzzy logic based inference methods, taking advantage of its ability to perform inferences from data by providing a computational framework for knowledge that is in linguistic form. It also makes it amenable for implementation on hardware because of the commercially available fuzzy logic chips that already exist in real-world systems such as camcorders for image stabilization, washing machines, etc. The present invention enables much more efficient and robust color segmentation that forms core components for several computer vision algorithms.

79 Claims, 11 Drawing Sheets
(6 of 11 Drawing Sheet(s) Filed in Color)

OTHER PUBLICATIONS

D. H. Marimont and B. A. Wandell, "Linear Models of Surface and Illuminant Spectra," Journal of Optical Society of America, vol. 9, pp. 1905-1913, 1992.

D. H. Brainard and W. T. Freeman, "Bayesian Color Constancy," Journal of Optical Society of America, vol. 14, pp. 1393-1411, 1997.

D. A. Forsyth, "Sampling, Resampling and Color Constancy," in Proc. of CVPR, pp. 300-305, 1999.

C. K. Yang and W. H. Tsai, "Reduction of color space dimensionality by moment-preserving thresholding and its application for edge detection in color images," Pattern Recognition Letters, vol. 17, pp. 481-490, 1996.

E. H. Land, "Recent advances in Retinex theory and some implications for cortical computations: Color vision and the natural image," Proc. of National Academy of Science, vol. 80, pp. 5163-5169, Aug. 1983.

B. V. Funt, K. Barnard and L. Martin, "Is Machine Color Constancy good enough?", In Proc. of ECCV, pp. 445-459, 1998.

D. H. Pritchard, "U. S. Color Television fundamentals—a review," IEEE Transactions on Consumer Electronics, vol. 23, No. 4, pp. 467-478, 1977.

* cited by examiner

CLOTH

INPUT (BLUE)

INPUT (RED)

COLOR COMPENSATED

COLOR COMPENSATED

PLASTIC, WOOL & PLASTIC

INPUT (BLUE)

INPUT (RED)

COLOR BALANCED

COLOR BALANCED

GLASS AND METALLIC OBJECTS

INPUT (BLUE)

INPUT (RED)

COLOR BALANCED

COLOR BALANCED

METHOD FOR AUTOMATIC COLOR BALANCING IN DIGITAL IMAGES

BACKGROUND OF THE INVENTION (1) Field of the Invention

This invention relates to digital imagery and, more particularly, to automatic color balancing of digital images.

(2) Description of Related Art

Of the many concerns facing the design of a digital camera, the problem of color balancing is of primary importance. One might naively believe that the best way to resolve this issue is to create sensors that sample a spectral power distribution with extreme precision, creating an image that most accurately represents the color properties of the world. However, this is not the case when one is making cameras for human observers. A major problem lies in the fact that the human visual system does not "see" colors by simply calculating the precise wavelengths absorbed by the three photoreceptors (the Red, Green, and Blue (RGB) receptors). Rather, the brain sees colors in terms of the relative spectral distribution over the entire scene. That is, the human eye automatically adjusts to color temperature changes within the 2800 K (tungsten) to 5500 K (daylight) range through a well-known process called color constancy. As a result, a piece of paper looks white when viewed under a tungsten, halogen, or fluorescent lamp or when viewed outdoors. These conditions vary greatly in terms of the spectral power distribution ultimately reflected to the eye, yet the paper looks white, the letters look black, and the colors do not seem to change. There are, of course, limits in extreme low lighting conditions such as during and after sunsets. For example, a piece of paper that appears orange in the summer when the sun is a large red disk in the horizon has a bluish hue when the sun is setting under cloud cover. Despite the eye's shortcomings under extreme lighting conditions its color balancing properties are quite amazing. The exact mechanism by which the eye performs its color balancing function remains a mystery. However, this visual correction mechanism does not extend to images on a computer display or on photographic print. Simply taking raw Red, Green, and Blue (RGB) color channel data from a camera and dumping it to the screen will not produce an acceptable image. For instance, a native image captured in a tungsten-lit room will have an overwhelmingly yellowish tint and a digital camera must determine a way to color-balance such input data automatically. Put simply, the goal of color constancy is to change the appearance of the scene illuminant to one of constant spectral power density (i.e. white light). However, with only three spectral samples (e.g. Red, Green, and Blue) per pixel, a perfect reconstruction is impossible. Nevertheless, people have developed empirical methods that partially solve this problem.

The following equation mathematically expresses the basic process of picture taking:

$$R(E1,E2,E3,)=(S1,S2,S3)*(\text{reflectance})*(SPD \text{ of light source}), \quad (1)$$

where R is the total response, the E's are the relative responses of the light sensors (to be converted to the RGB values that the camera outputs), the S's are the relative sensitivities of these sensors to various wavelengths of light, the reflectance is a property of the object being viewed (e.g. its material—wood, metal, etc.), and SPD is the spectral power distribution of the light source. The combined product of reflectance and SPD gives the actual spectral power distribution that impinges the eyes, or that the sensors of a camera absorb. The problem is that there are many possible ways of attaining the same product, and is difficult to determine the unique reflectance of an object (which determines its perceived color).

Two major theories provide a mechanism for partially solving the problems associated with the above equation. One is called the Gray-World theory that assumes that since all colors in a given image should average to some shade of gray, one can scale the responses with respect to how much of that shade is present at the various sampled points in the visual field. Statistically, the Gray-World assumption makes perfect sense: in an image with similar dynamic ranges for each of its color components, which is generally true of the pictures taken by a camera, each spectral sample has an equal probability of being above or below a certain fixed value. By summing across hundreds of thousands of samples, one would expect the average to converge to that fixed value (shade of gray).

A camera can exploit this observation to color-balance an image. First, the camera calculates average values for the red, green, and blue components from raw image data. By the Gray-World assumption, these three components should have the same value. However, if the illuminant does not have a constant SPD, these average values will deviate from one another in a way that is characteristic of the color appearance of the illuminant. One, in essence, factors out the average assumed to represent the SPD of the light source in order to attain the relative reflectance of the objects as if viewed under a white light. For instance, data obtained under a tungsten illuminant will have higher red and green averages than blue averages. To force the Gray-World assumption to hold, the camera can scale each of the color channels independently to equalize the RGB averages. The camera begins by picking an overall value for the averages to converge. One convenient value is simply the average of the three component averages. Multiplying each color channel by the overall average divided by the component average will yield an image for which the Gray-World assumption is true. This approach is not exact, but it manages to scale the responses in terms of surrounding conditions, and is therefore a good approximation for color balancing.

Another such approach that also tries to approximate the lighting conditions is know as the Perfect-Reflector hypothesis that assumes that the brightest object in an image reflects the best approximation of the SPD of the light source. Therefore, the RGB values of the brightest or most reflective spot are used to scale the RGB's of all other objects in the image in order to obtain a relative reading for the entire image. Thus, if one wishes to reconstruct the color appearance of the subject under white light, one should scale the image's RGB components to render the specular white. The scale factor for each color channel is just 255/specular value for an 8-bit system. This algorithm focuses only on the specular or glossy surfaces in the image and does not take into account the overall appearance. In fact, this may be a better approach for images where there is too little color variation for the Gray-World assumption to hold.

There are other algorithms for color constancy in the literature. In E. H. Land et al., titled "Lightness and Retinex theory," Journal of Optical Society of America, Vol. 61, no. 1, PP. 1-11, January 1971, the authors adopted an approach based on illuminant spatial frequency in order to compensate for variations in color. A computational model was built for modeling color constancy by L. T. Mahoney et al. and reported in the article "A Computational Model for Color Constancy," Journal of Optical Society of America, Vol. 1, PP. 29-33, 1986, that attempted to model surface reflectance by low-dimensional families of surfaces. This model was later simplified using linear models taught by D. H. Marimont et al. and reported in the article "Linear Model for Color Constancy," Journal of Optical Society of America, Vol. 1, PP. 1905-1913, 1992. In an article by D. H. Brained et al, titled "Bayseian Color Constancy," Journal of Optical Society of America, vol. 14, PP. 1393-1411, 1997, the authors proposed modeling color constancy as a Bayesian model that uses the cues such as surface reflectance and illuminant spectra to make Bayesian decisions that maximize expected utility. B. V. Funt et al., as demonstrated in their article titled "Is machine color constancy good enough?" in Proc. of ECCV, PP. 445-459, 1998, found this approach inaccurate. An attempt to improve the Perfect-Reflector algorithm was made by D. A. Forsyth and was described in the article titled "Sampling, Resampling and Color Constancy," in Proc. of CVPR, PP 300-305, 1999. The attempt proposed a resampling approach as a solution, but resulted in a method that is computationally slow and that required several frames to accurately correct for variations in color.

There are also several patented approaches for achieving color constancy, broadly classified into hardware-based and software-based approaches. The software-based approaches typically provide a solution based on modifying a camera sensor in some fashion to achieve color constancy. U.S. Pat. No. 6,417,863 disclosed numerous embodiments of a method for adjusting the color balance of a display. In one embodiment, the color balance of a display is adjusted by modulating two selected colors so that at some point during the modulation the two colors appear substantially the same on the display and the modulation adjusts to change the point at which the colors appear substantially the same. The color balance of the display is modified, in part, based on a measurement of the modulation adjustment. In another embodiment of a method for adjusting the color balance of a display, the reference teaches the modification of the luminance and/or chromaticity of a color from the color space of the display, and modulation of luminance and/or chromaticity of a color from a reference color space, where, over time the applied modulation results in the two colors becoming substantially the same. Thus, the modulation adjusts so that the colors appear substantially the same at a selected point during the modulation of both colors, and the color balance of the display modifies partly based on a measurement of the modulation adjustment. This approach is not automatic in its balancing because it requires the user to pre-select, either the colors or provide reference color display for modulation adjustment. Accordingly, it is less attractive due to the need for user input.

In U.S. Pat. No. 6,388,648, a liquid crystal display (LCD) projection unit employs a luminance and color balance system employing an LCD array characterization lookup table storing multiple sets of luminance and gamma correction values that are user-selectable to control luminance and color balance. The lookup table values are determined by measuring the transfer function of the LCD array in the projection unit for each of a set of red ("R"), green ("G"), and blue ("B") input data values, converting the resulting S-curve responses (color responses) to corresponding sets of gamma responses and scaling the gamma responses to generate multiple R, G, and B families of luminance and gamma corrected values. Color balance is adjusted by selecting the particular R, G, and B families of luminance and gamma corrected values that cause the LCD projection unit to match a predetermined ratio of R, G, and B luminance values. Luminance adjusts by selecting sets of families of R, G, and B luminance values that maintain the color balance ratio while causing the LCD to transmit a desired overall luminance. This technique has the disadvantage of requiring the storage of a large lookup table in order to tackle variations in lighting. Furthermore, the luminance and gamma correction values have to be user-selected which implies that the approach is not automatic.

U.S. Pat. No. 5,231,504 disclosed an improved method for using a linear mixing space, such as a CIE (Commission Internationale de l'Eclairage) color space, to determine the quantities of coloring agents needed to reproduce a color, applicable, for example, to printing a color that matches an original color on a cathode ray tube (CRT) display. The calculations match hue, saturation and reflectance so that the matching color appears like the original color and so that those characteristics of an original image are preserved. An original color's definition converts into coordinates in the linear mixing space. An achromatic region in the linear mixing space, preferably elliptically shaped, includes the coordinates of the neutral coloring agents. Only quantities of neutral coloring agents match the original colors falling within the achromatic region. This approach however, does not address the issue of color constancy of scenes as imaged by a camera under varying lighting conditions. The focus is more on reproducing a print of the colors on a CRT display.

U.S. Pat. No. 5,504,524 presented a method of controlling the color balance of a video signal that comprises green, red, and blue channel signals. The patent identifies pixels that have a green intensity within a peak intensity band. For these pixels, the reference examines the red and blue intensities to identify pixel subsets within respective red and blue peak bands. If the red and/or blue peak band(s) are/is greater than the green peak band, the gain of the red and/or blue channel(s) is increased. If the red and/or blue peak band(s) are/is lower than the green peak band, red and/or blue peak band(s) are/is determined for the entire video frame, and compared with the green peak band. If the red and/or blue peak band(s) for the entire frame are/is lower than that for the green channel, the gain of the red and/or blue channel(s) are/is increased. However, this algorithm does not perform well for images where there is too little color variation or for images with high specula reflections.

In light of the current state of the art and the drawbacks to current systems mentioned above, a need exists for a system that would automatically color balance an image to correct for various lighting situations. That is, it would minimize discrepancies that exist between the natural response of a human eye and the response of an image-capturing device.

BRIEF SUMMARY OF THE INVENTION

The present invention provides an automatic color balancing system and method for digital images that operate by effectively performing adaptive weighting of surface reflectance and illuminant spectra components of the image. The adaptive weighting mechanism of the present invention is derived from fuzzy logic-based inference methods. The advantage of fuzzy logic methods is the ability to perform inferences from data by providing a computational framework for knowledge that is in linguistic form. It also makes the present invention amenable for implementation on hardware because of the commercially available fuzzy logic chips that exist in real-world systems such as camcorders for image stabilization, in washing machines, etc. The present invention enables much more efficient and robust color segmentation, an operation that serves as a core component of many computer vision algorithms.

One aspect if the present invention provides both a system and a method for automatic color balancing in digital images on a data processing system by receiving a current color image into a data processing system, providing a set of Image-Wide Luminance (IL) factors, and a set of Localized Luminance (LL) factors based on the current color image. The system further computes a set of weights representing a combination application of the IL factors and the LL factors, and then computes a set of color balance factors, where each color balance factor is computed from the IL factors, the LL factors, and the weights. It then constructs a new color image using the set of color balance factors and the current color image.

Another aspect of the present invention computes the weights as a function of luminance.

In yet another aspect of the present invention the weights are generated from fuzzy membership functions, with each function having a plurality of anchor points.

In a further aspect, the present invention includes a maximum-weight anchor point and a minimum-weight anchor point with a sloped set of values connecting the two anchor points.

In still further aspect, the present invention includes both IL weights and LL weights.

In another aspect, the present invention provides a set of fuzzy membership functions including an IL fuzzy membership function and an LL fuzzy membership function, separated by a ratio comprised of an LL fuzzy membership function maximum-weight anchor point to an IL fuzzy membership function maximum-weight anchor point, with this ratio set to a value of at least one.

In yet another aspect, the present invention obtains the IL weights from the IL fuzzy membership function according to the following expression:

$$W_{IL} = 1.0 \text{ if } S < \beta_{IL}$$
$$= 2 * \left[\frac{S - \beta_{IL}}{\gamma_{IL} - \beta_{IL}}\right]^2 \text{ if } \beta_{IL} \leq S < \frac{\gamma_{IL} + \beta_{IL}}{2}$$
$$= 1 - \left(2 * \left[\frac{S - \beta_{IL}}{\gamma_{IL} - \beta_{IL}}\right]^2\right) \text{ if } \frac{\gamma_{IL} + \beta_{IL}}{2} \leq S < \gamma_{IL}$$
$$= 0.0 \text{ if } S > \gamma_{IL},$$

where $W_{IL}$ represents an IL weight;
S represents image-wide average luminance;
$\beta_{IL}$ represents a maximum-weight anchor point in the fuzzy membership function; and
$\gamma_{IL}$ represents a minimum-weight anchor point of the fuzzy membership function.

In another aspect the present invention obtains the LL weights from the LL fuzzy membership function according to the following expression:

$$W_{LL} = 1.0 \text{ if } S > \beta_{LL}$$
$$= 2 * \left[\frac{S - \gamma_{LL}}{\beta_{LL} - \gamma_{LL}}\right]^2 \text{ if } \gamma_{LL} \leq S < \frac{\gamma_{LL} + \beta_{LL}}{2}$$
$$= 1 - \left(2 * \left[\frac{S - \gamma_{LL}}{\beta_{LL} - \gamma_{LL}}\right]^2\right) \text{ if } \frac{\gamma_{LL} + \beta_{LL}}{2} \leq S < \beta_{LL}$$
$$= 0.0 \text{ if } S < \gamma_{LL},$$

where $W_{LL}$ represents an LL weight;
S represents image-wide average luminance;
$\beta_{LL}$ represents a maximum-weight anchor point in the fuzzy membership function; and
$\gamma_{LL}$ represents a minimum-weight anchor point of the fuzzy membership function.

In a further aspect, the present invention computes the set of color balance factors by multiplying the IL factors with the IL weights to generate IL balance factors and multiplying the LL factors with the LL weights to generate LL balance factors, and adding the IL balance factors with the LL balance factors to generate the set of color balance factors. In order to construct a new color image, the current image is multiplied by the set of color balance factors.

In a still further aspect, the present invention provides the computations of the IL factors based on the current color image, which comprises a set of pixels p, with each pixel p including a plurality of color channels X. Computing of IL factors is performed by first computing an average intensity value $A_X$ for each channel X, i.e. summing an intensity for a single channel X at each pixel p in the image and dividing by the number of pixels in the image. Expressing this mathematically:

$$A_X = \left(\sum_{i=1}^{p} X_i\right) / p.$$

Second, an overall average image intensity value A is computed by summing the average intensity value $A_X$ for all channels and dividing by a total number of channels in accordance with the following mathematical expression:

$$A = \frac{\sum_{i=1}^{m} A_{X_i}}{m}$$

where m represents the total number of channels.

Last, a set of the IL factor for each channel is computed from:

$$IL_X = \frac{A}{A_X}.$$

In another aspect, the present invention provides the set of LL factors based on the current color image by selecting a color space for each pixel p, wherein the color space includes the plurality of color channels X for that pixel p. The color space is selected from a group consisting of: RGB, CMYK, YIQ, YUV, HSB, HSL, and HSV and the channels X for a particular space are normalized between 0.0 and 1.0. The LL factors compute by determining a maximum luminance pixel for each channel X, identifying pixels surrounding the maximum luminance pixel, and denoting a maximum luminance point with the maximum luminance pixel and the pixels surrounding the maximum pixel. The LL factors are computed from a luminance in the channel X at the maximum luminance point as follows:

$$LL_X = \frac{1.0}{S_X}, \text{ where:}$$

$S_X$ is the luminance in channel X.

These and other features, aspects, and advantages of the invention will be apparent to those skilled in the art from the following detailed description the present invention, taken together with the drawings and the claims that follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

It is to be understood that the drawings presented herein are to be used for the purposes of exemplary illustration only and not as a definition of the limits of the invention. Referring to the drawings in which like reference numbers present corresponding parts throughout.

Figure 1:
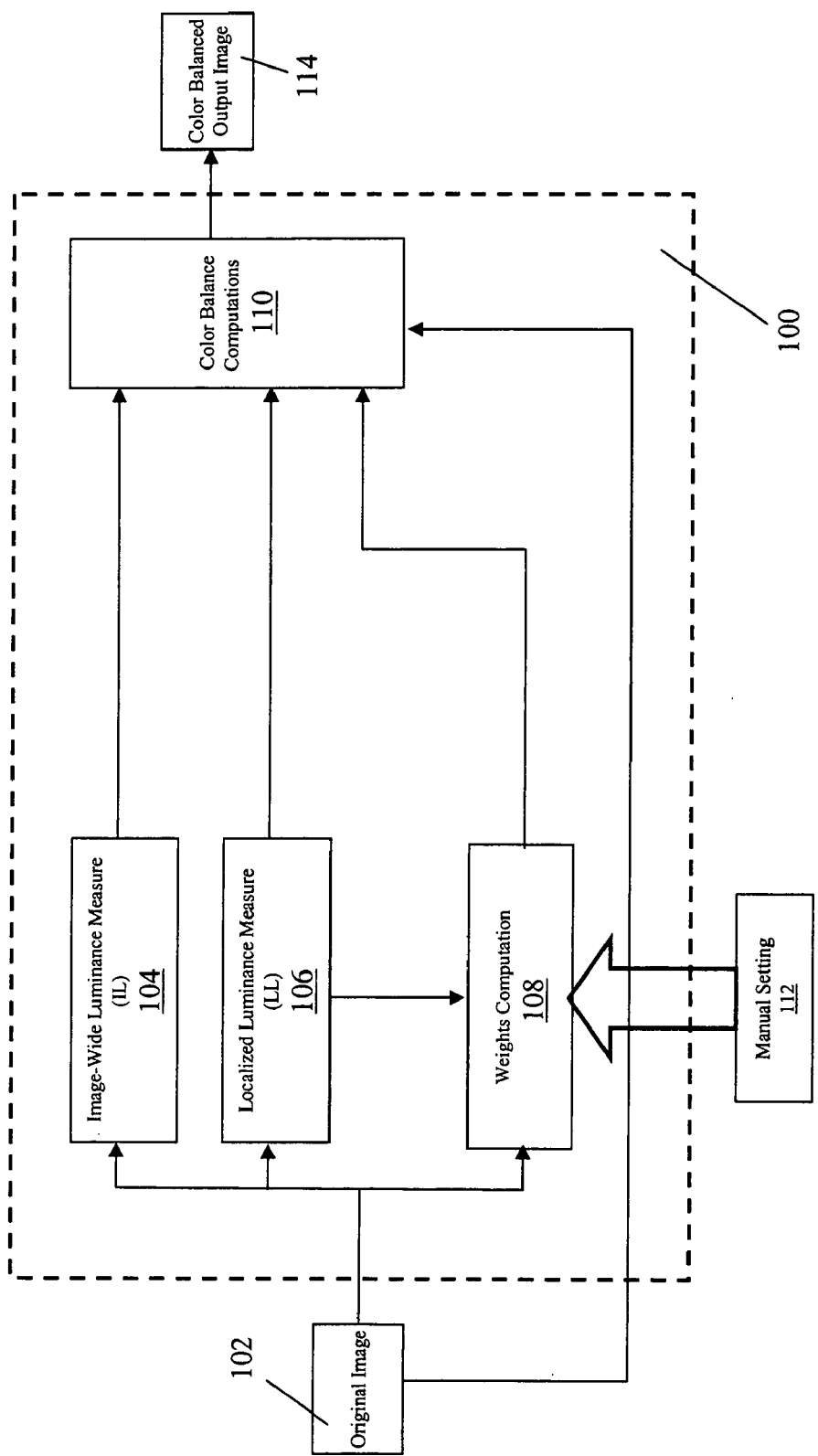
FIG. 1 is an exemplary general overview flow diagram of the present invention.

DETAILED DESCRIPTION OF THE INVENTION (1) Introduction

In the field of image capturing, whether analog, such as through the use of traditional film-based cameras, or digital, such as through the use of charge-coupled device (CCD) or other digital imaging systems, discrepancies exist between the natural response of a human eye and the response of an image capturing device. In particular, even though calibrated to match with the eye's response under one set of lighting conditions, when the lighting conditions vary, current image capturing devices often do not maintain their calibration. Thus, pictures taken at different times, particularly under low lighting conditions, do not appear the same as the scene from which they were obtained would when viewed with the naked eye.

The present invention provides a solution to this problem by utilizing Image-Wide Luminance measures, Localized Luminance measures, and weights to adjust the color balance of an input image and produce a color-balanced output image.

Before providing details regarding each of these components of the invention, first a glossary of terms is provided as a reference for the reader. Next, a system overview is provided, describing the interconnection and operation of various major components of a system in accordance with the present invention. After the system overview, a data processing system overview is presented to acquaint the reader with the various components typically found in a data processing system that may be used in conjunction with the present invention. Next, a discussion section is provided in which the various major components presented in the system overview are discussed in detail. Finally, a results section is provided, which presents non-limiting examples of the operation of the present invention in order to provide a more tangible understanding of the operation of the invention.

(2) Glossary

In order to provide a working frame of reference, a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Color Balancing Factor—A color balancing factor is a parameter derived from various luminescence measures required to color balance an image.

Current Color Image—A current color image is the input or the original data (in the form of image data).

Data Processing System—A data processing system as defined herein generally refers to any general or specific-purpose computer system capable of processing data in a manner compatible with the present invention.

Image-Wide Luminance (IL) Measure—An Image-Wide Luminance measure is a hypothetical assumption that attempts to approximate lighting conditions by using values generated from a portion of an image that may include the entire image. An example of an Image-Wide Luminance measure a measure generated by a Gray World Theory, which assumes that all colors in a given image should average to some shade of gray, and that one can scale the responses (of objects to lighting conditions) with respect to how much of that shade is present at the various sampled points in the visual field. That is, it manages to scale the responses in terms of surrounding conditions.

Image-Wide Luminance Scale (ILS) Factors—An Image-Wide Luminance scale factor is a ratio of the average intensity A of luminescence to the average of each color channel $A_{ChannelM}$ of an image.

Image-Wide Luminance Fuzzy Membership Functions—Image-Wide Luminance fuzzy membership functions are fuzzy membership functions representing IL measures.

Image-Wide Luminance Weights—Image-Wide Luminance weights are IL confidence levels (in terms of probability).

Localized Luminance (LL)—Localized Luminance is a hypothetical assumption that tries to approximate lighting conditions. It assumes that the brightest object (or region) in an image reflects the best approximate of the light source.

Localized Luminance Scale (LLS) Factor—A Localized Luminance Scale Factors is a ratio of the normalized weight (1.0) to a color channel, given by $LLS_{channel\_M} = 1.0/L_{channel\_M}$.

Localized Luminance Fuzzy Membership Functions—Localized Luminance fuzzy membership functions are fuzzy membership functions representing LL measures.

Localized Luminance Weights—Localized Luminance weights are LL confidence levels (in terms of probability).

Luminescence—Luminescence is a measure of light intensity.

New Color Image—A new color image is an output of the present invention, in the form of processed data (an output image).

Weight—A weight is a confidence level (in terms of probability).

(3) System Overview

As illustrated in FIG. 1, the present invention provides an improved color balancing technique 100 that utilizes a fuzzy inference mechanism within a weight computation block 108, combined with an Image-Wide Luminescence (IL) measure 104 and a Localized Luminescence (LL) measure 106 to provide accurate color balancing under a wide variety of lighting conditions. More specifically, upon receiving an original color image 102 into the system 100, the IL measure computation block 104 and the LL measure computation block 106 operate to generate their respective scale factors. In addition, the weight computation block 108 takes place after receiving the location of a set L of pixels from the LL measure computation block 106. Subsequently, the IL factors, the LL factors, and the weights are provided to the color balance computations block 110 where the weights are multiplied by the IL and LL factors to generate a set of color balance factors, which are then further processed with the original input image 102 to construct the new color image 114.

As illustrated, using a fuzzy inference mechanism, the present invention combines an Image-Wide Luminescence measure (IL) 104 such as the Gray-World hypothesis with a Localized Luminescence measure (LL) 106 such as the Perfect-Reflector hypothesis for color balancing of digital images 102. The Gray-World assumption algorithm tends to over-compensate (bright regions in an image become too bluish) whereas the Perfect-Reflector assumption algorithm tends to under-compensate (the yellowish cast in an image remains although specularities appear white). The present invention develops an automatic color balancing system and method 100 for digital images 102 by performing adaptive weighting of surface reflectance (e.g. Gray-World) and illuminant spectra (e.g. Perfect-Reflector) components of the image 102. The adaptive weighting mechanism is derived from fuzzy logic based inference methods, which have the ability to perform inferences from data by providing a computational framework for knowledge that is in linguistic form.

The performance of an Image-Wide Luminescence measure (IL) 104, such as the Gray-World hypothesis, suffers relative to a Localized Luminescence measure (LL) 106, such as the Perfect-Reflector hypothesis, when there is little color variation in the image 102. If the image 102 has a variety of textures or other color variations, then Image-Wide Luminescence IL measures 104 are reasonably good for color balancing. On the other hand, Localized Luminescence LL measures 106 work very well under low color variation conditions in the image 102 or when the image 102 consists of objects that are highly specular in nature. If the amount of spectral power density is limited due to a negligible amount of glossy surfaces in the image 102, then assumptions such as Gray-World perform better color balancing. In this sense, the two approaches are complementary. The present invention provides an adaptive method to combine the strengths of each algorithm while minimizing the effects of their weakness, without much manual adjustment to system parameters (with the exception of a single manual setting 112, discussed in details below). Furthermore, the approach is computationally simple and thus amenable for implementation as an embedded solution in many of the available digital systems, such as in digital cameras and computer processors. The core idea of the present invention is that IF the overall image pixel is not very bright OR has low overall brightness THEN apply an image wide luminescence measure (IL) 104 such as the Gray-World hypothesis; similarly, IF the image pixel is very bright OR has high overall brightness THEN apply a Localized Luminescence measure (LL) 106 such as the Perfect-Reflector hypothesis. The fuzzy logic theory provides a computational framework for the application of these rules.

(4) Data Processing System Overview

Figure 3:
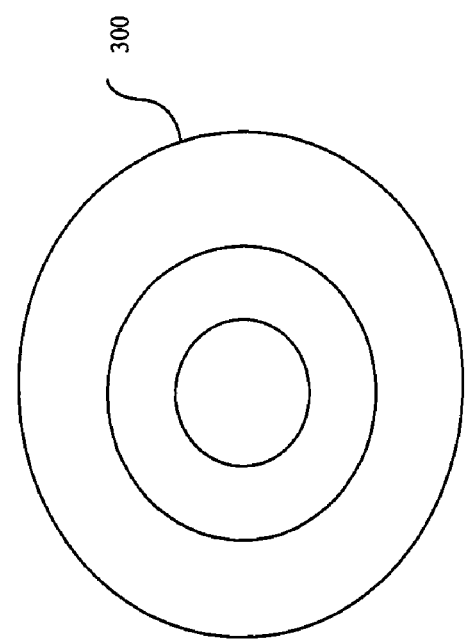
FIG. 3 is an exemplary illustration of a data storage unit (medium) in accordance with the present invention.
Figure 2:
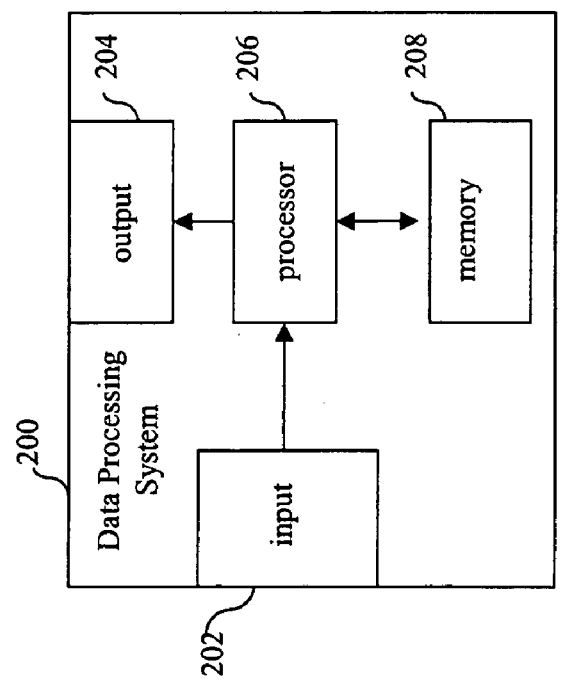
FIG. 2 is an exemplary illustration of a data processing system in accordance with the present invention.

A block diagram depicting the components of a computer system used in the present invention is provided in FIG. 2. The data processing system 200 comprises an input 202 for receiving image input signals from any inputting mechanism, including but not limited to, an external computer connected to the system, an internet connection, or any computer readable medium 300 (illustrated in FIG. 3) such as a floppy disk, Compact Disk (CD), a Digital Versatile Disk/Digital Video Disk (DVD), and a removable hard drive. The input 202 may also be configured for receiving user input from another input device such as keyboard, a mouse, or any other input device best suited for the current environment conditions (e.g. image processing). Note that the input 202 may include multiple "ports" for receiving data and user input, and may also be configured to receive information from remote databases using wired or wireless connections. The output 204 is connected with the processor 206 for providing output to the user, possibly through a video display. Output 204 may also be provided to other devices or other programs, e.g. to other software modules, for use therein, possibly serving as a wired or wireless gateway to external databases or other processing devices. The input 202 and the output 204 are both coupled with a processor 206, which may be a general-purpose computer processor or a specialized processor designed specifically for use with the present invention. The processor 206 is coupled with a memory 208 to permit storage of data and software to be manipulated by commands to the processor.

(5) Discussion

Figure 4:
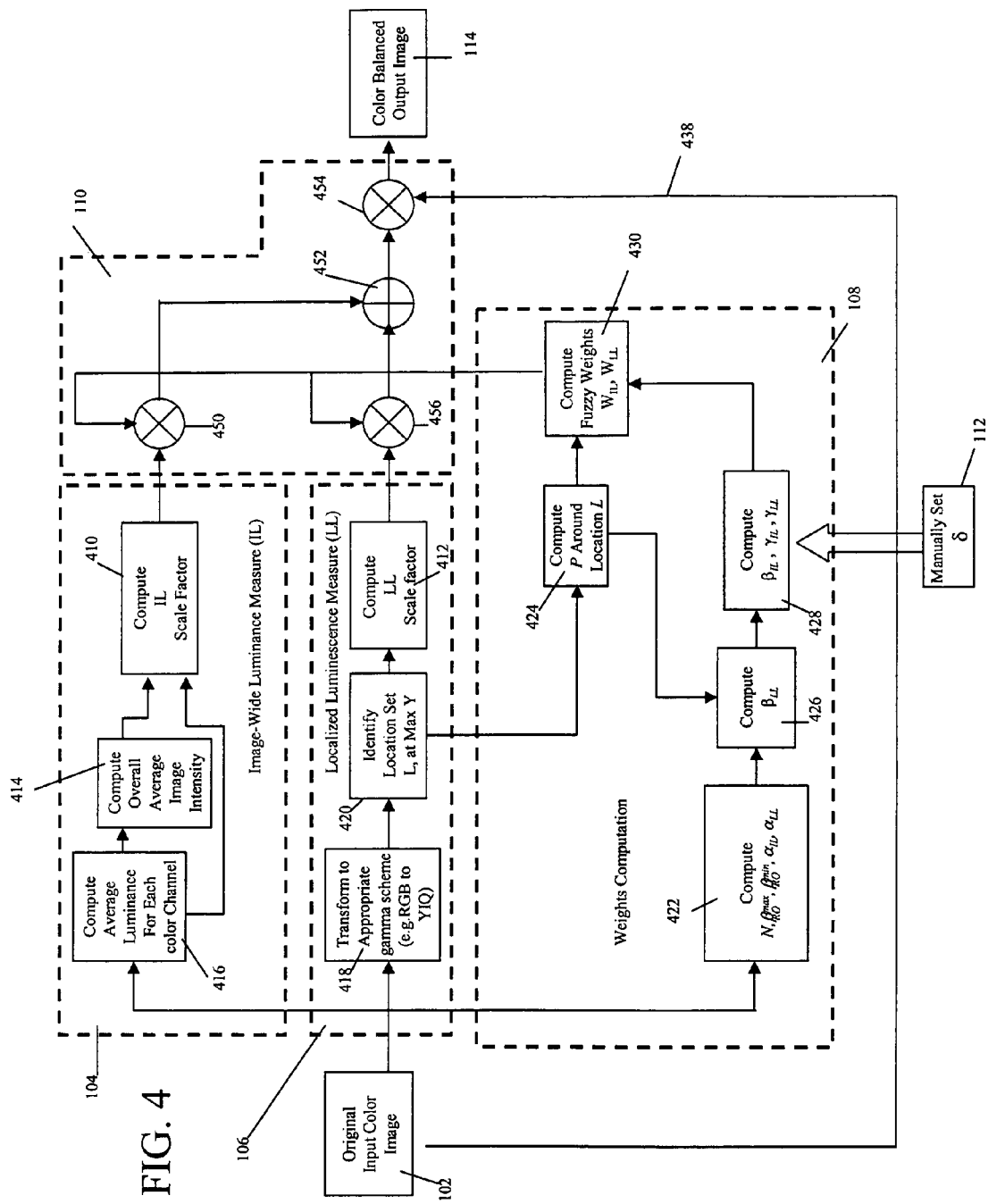
FIG. 4 is an exemplary flow diagram depicting operations involved in processing an image in accordance with the present invention.

This portion of the description focuses on the system shown in FIG. 4, which is a more detailed illustration of the system shown in FIG. 1. FIG. 4 is an exemplary flow diagram depicting operations involved in processing an original input color image 102 in accordance with the present invention to generate a color balanced output image 114. Also, with respect to the description of FIG. 4, the terms Image-Wide Luminescence measure (IL) 104 and Localized Luminescence measure (LL) 106 will be used with the understanding that specific methods such as the Gray-World and the Perfect Reflector hypotheses can respectively be substituted therefor.

Given the general understanding of the interaction of the Image-Wide Luminance measures module 104, the Localized Luminescence module 106, the weight computation module 108, and the color balance factors for generating a color-balanced output image 114 that was provided in the system overview section with respect to FIG. 1, the operation of each of these individual components is described in its respective subsection below.

(a) Image-Wide Luminance Measures (IL) Module

The generation of Image-Wide Luminance (IL) Measures 104 commences with computing the average luminescence of each color channel 416 in accordance with the following:

$$A_{red} = \left(\sum_{i=1}^{N} R_i\right) / N, \tag{2}$$

$$A_{green} = \left(\sum_{i=1}^{N} G_i\right) / N, \text{ and} \tag{3}$$

$$A_{Blue} = \left(\sum_{i=1}^{N} B_i\right) / N, \tag{4}$$

where $A_{red}$, $A_{green}$, $A_{blue}$, are the averages of red (R), green (G), and blue (B) color channels, N is the number of pixels in an image, and i is an index variable from 1 to N. Block 414 receives the averages output from block 416 to compute the overall average image intensity. The overall average image intensity 414 is calculated by the following equation:

$$A = (A_{red} + A_{green} + A_{blue})/3, \tag{5}$$

where A is the overall average image intensity 414. The above formulas can easily generalize for M channels, and are not limited to the three-color channels of RGB color space mentioned. For example, if a gamma-scheme used has M color channels, the computation for the average luminance of each color channel 416 is as follows:

$$A_{Channel\ 1} = \left(\sum_{i=1}^{N} Ch1_i\right) / N, \tag{6}$$

$$A_{Channel\ 2} = \left(\sum_{i=1}^{N} Ch2_i\right) / N, \text{ and} \tag{7}$$

$$A_{Channel\ M} = \left(\sum_{i=1}^{N} ChM_i\right) / N, \tag{8}$$

In addition, the computation of the overall average image intensity 414 of these M channel averages 416 is as follows:

$$A = (A_{Ch1} + A_{Ch2} + \ldots + A_{ChM})/M \tag{9}$$

$$A = \frac{\sum_{i=1}^{M} A_{Ch\ i}}{M}. \tag{10}$$

The average luminance for each color channel from block 416 and the overall average image intensity from block 414 are provided to block 410 to compute the Image-Wide Luminance scale (ILS) factors. The ratio of the average intensity A to the average of each color channel $A_{Channel\ M}$ is termed the Image-Wide Luminescence scale (ILS) factor 410 (in the example discussed for the three color channels):

$$ILS_{Red} = A/A_{Red}, \tag{11}$$

$$ILS_{Green} = A/A_{Green}, \text{ and} \tag{12}$$

$$ILS_{Blue} = A/A_{Blue}. \tag{13}$$

Equation (13) can be further generalized to any Image-Wide Luminescence (IL) system as follows:

$$ILS_{Channel\_M} = A/A_{Channel\_M}. \tag{14}$$

The resulting scale factors (ILS) 410 are then provided to the color balance computation block 110 for further processing (described in detail below).

(b) Localized Luminescence Measure (LL) Module

Computations for Localized Luminescence measure 106 (the Localized Luminescence scale (LLS) factors 412) for an input image 102 commences with the optional transformation of the input image 102 into another color-space (gamma scheme) at block 418. The choice of color spaces depends on the intended use of the image. For processing images viewed by humans, one may transform the original color space (such as RGB) to a YIQ color space. In the example described here, the present invention at block 418 of FIG. 4 transforms the original RGB color space into YIQ by using the following set of equations:

$$\begin{pmatrix} Y \\ I \\ Q \end{pmatrix} \begin{pmatrix} 0.299 & 0.578 & 0.114 \\ 0.596 & -0.275 & -0.321 \\ 0.212 & -0.523 & 0.311 \end{pmatrix} \begin{pmatrix} R \\ G \\ B \end{pmatrix}. \tag{15}$$

The YIQ space is a well-known system for performing electronic color analyses (such as those used for television). The Y component of this space provides a more stable estimate for the luminance than the regular RGB space. That is, the YIQ space is perceptually less variant to changes in illumination than the RGB color space. Hence, the YIQ better helps to balance the hue and the saturation content of an image in a perceptually more pleasing and a more human perception-like manner. Of course, other well-known color gamma schemes, non-limiting examples of which include CMY, CMYK, CIE, YUV, HSV, HSB, and HSL, may also be used, depending on the particular application for which they are intended to be used. Although each gamma scheme has a different purpose, in general, any of them may easily substitute for the exemplary YIQ system used herein.

The transformed color-space of the input image 102 is provided to block 420 for identification of pixels with maximum luminescence. As further illustrated in block 420 of FIG. 4, the image processing system of the present invention uses the Y component for a given image to locate (identify)

the pixel(s) at locations L with maximum Y value (maximum luminescence). Using these image dependent parameters, the present invention formulates the Localized Luminescence scale (LLS) factors 412 for the three-color channels:

$$LLS_{Red}=1.0/L_{Red}, \quad (16)$$

$$LLS_{Green}=1.0/L_{Green}, \text{ and} \quad (17)$$

$$LLS_{Blue}=1.0/L_{Blue}, \quad (18)$$

where $L_{Red}$, $L_{Green}$, and $L_{Blue}$ represent luminescence in each respective color channel. These equations generalize to:

$$LLS_{channel\_M}=1.0/L_{channel\_M}, \quad (19)$$

where $L_{channel\_M}$ represents luminescence in channel M. The identified location set L from block 420 is provided to block 424 of Weights Computation module 108 (described below). The resulting scale factors (LLS) 412 are then provided to the color balance computation block 110 for further processing.

(c) Weight Computation Module

Figure 5:
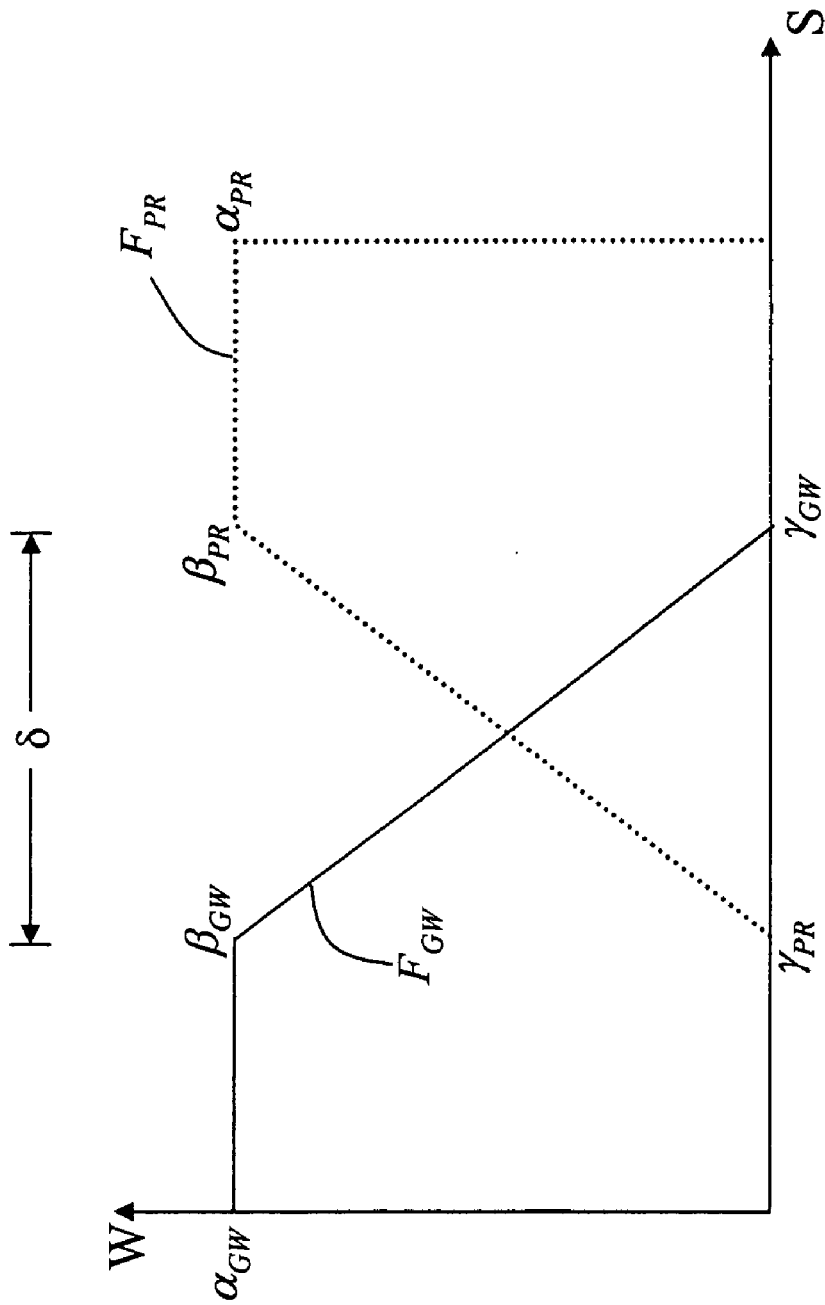
FIG. 5 is an exemplary illustration of two trapezoidal fuzzy membership functions for Gray-World and Perfect-Reflector hypotheses according to the present invention.
Figure 6:
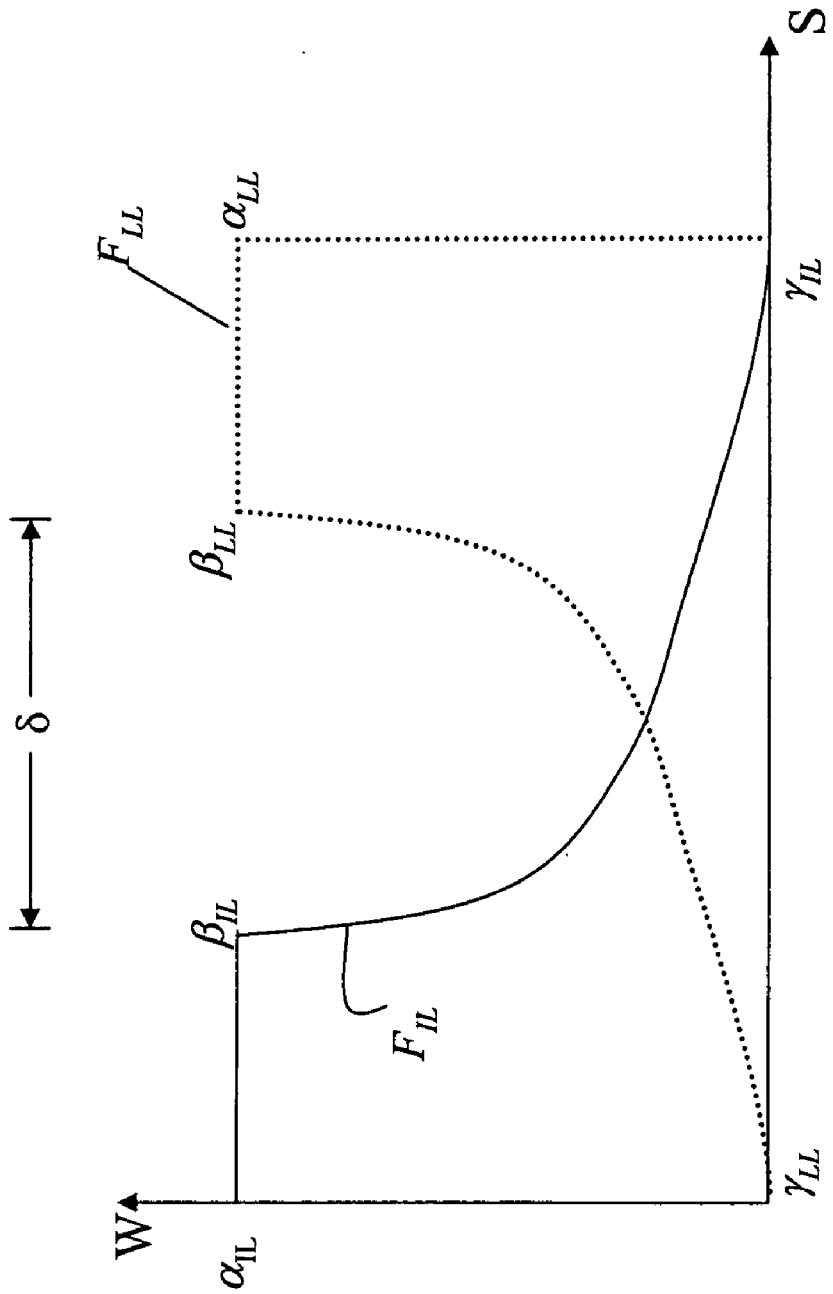
FIG. 6 is an exemplary illustration of two fuzzy membership functions for Image-Wide Luminance measure (IL) and Localized Luminance measure (LL) hypotheses in accordance with the present invention.

The exemplary FIGS. 5 and 6 graphically illustrate the derivation of weights, and serve as a framework for more clearly presenting the various processes illustrated in the weight computation block 108 of FIG. 4. Referring to all three FIGS. 4, 5, and 6, in the exemplary graphical illustration of FIG. 5 S is defined to be the total sum of Red, Green, and Blue channels of an RGB space in the color image. Two trapezoidal fuzzy membership functions are also defined, $F_{GW}$ for the Gray-World hypothesis and $F_{PR}$ for the Perfect-Reflector hypothesis. These fuzzy membership functions define the nature of the weighting for the Gray-World and Perfect-Reflector hypotheses for a given image. The parameter sets $\{\alpha_{GW}, \beta_{GW}, \gamma_{GW}\}$ and $\{\alpha_{PR}, \beta_{PR}, \gamma_{PR}\}$ illustrated are the starting, inflection, and floor points, respectively, of the individual fuzzy membership functions. The present invention provides a hybrid approach that automatically decides the weighting for linearly combining the scale factors derived from the Image-Wide Luminescence measure (IL) 104, and the same factors derived from the Localized Luminescence measure (LL) 106. The weights W given to each set of factors depend on each pixel's (R+G+B), or S, as shown in the FIG. 5. This combination of weights ensures that the specular regions in the image render as white and that the darker regions of the image are properly balanced using an Image-Wide Luminescence measure (IL) 106. The present invention uses the appropriate amount of weighting for the two hypotheses by modifying the shape of these membership functions for each input color image by adjusting these parameters based on image statistics. As illustrated in FIG. 6, the fuzzy membership functions need not be trapezoidal.

Proportions determined by the system then weight these scale factors. The weight assignment process is formulated for the Perfect-Reflector using the fuzzy membership defined in FIG. 5. The figure implies that the weighting of each hypothesis is a function of the combined pixel intensity at each pixel. For regular color images, it may be assumed without the loss of generality that all the three RGB-channels normalize between 0 and 1, and thus the maximum value of S is 3.0. To relax this, two parameters $S_{max}$ and $S_{min}$ are defined, corresponding to the maximum and minimum value of S for a given image. The weight for the Perfect-Reflector hypothesis is set to 1.0 for all pixels with combined pixel intensity that lie between $S_{max}$ and $\beta_{PR}$. If the combined pixel intensity falls below $\beta_{PR}$, then the weight may begin to drop linearly between $\beta_{PR}$ and $\beta_{PR}$. As illustrated in FIG. 6, weight can also drop non-linearly. For combined pixel intensity below $\gamma_{PR}$, the weight sets to zero. This process repeats for the Gray-World hypothesis. In that case, the weight is set to 1.0 for all pixels with combined pixel intensity between $S_{min}$ and $\gamma_{GW}$. If the combined pixel intensity is greater than $\beta_{GW}$, then the weight may begin to drop linearly between $\beta_{GW}$ and $\beta_{GW}$. Again, as illustrated in FIG. 6, the weight can also drop non-linearly. For combined pixel intensity above $\beta_{GW}$ the weight is set to zero. The mathematical expressions for the weights illustrated in FIGS. 5 and 6, which are computed at the block 430 of FIG. 4, are as follows, for FIG. 5:

$$W_{GW} = 1.0 \text{ if } S < \beta_{GW} \quad (20)$$
$$= 1.0 - \frac{(S - \beta_{GW})}{(\gamma_{GW} - \beta_{GW})} \text{ if } \beta_{GW} \leq S \leq \gamma_{GW}$$
$$= 0.0 \text{ if } S > \gamma_{GW}$$

and $$W_{PR} = 1.0 \text{ if } S > \beta_{PR} \quad (21)$$
$$= \frac{(S - \gamma_{PR})}{(\beta_{PR} - \gamma_{PR})} \text{ if } \gamma_{PR} \leq S \leq \beta_{PR}$$
$$= 0.0 \text{ if } S < \gamma_{PR}.$$

For a generalized version of FIG. 6:

$$W_{IL} = 1.0 \text{ if } S < \beta_{IL} \quad (22)$$
$$= 2 * \left[\frac{S - \beta_{IL}}{\gamma_{IL} - \beta_{IL}}\right]^2 \text{ if } \beta_{IL} \leq S < \frac{\gamma_{IL} + \beta_{IL}}{2}$$
$$= 1 - \left(2 * \left[\frac{S - \beta_{IL}}{\gamma_{IL} - \beta_{IL}}\right]^2\right) \text{ if } \frac{\gamma_{IL} + \beta_{IL}}{2} \leq S < \gamma_{IL}$$
$$= 0.0 \text{ if } S > \gamma_{IL}$$

and $$W_{LL} = 1.0 \text{ if } S > \beta_{LL} \quad (23)$$
$$= 2 * \left[\frac{S - \gamma_{LL}}{\beta_{LL} - \gamma_{LL}}\right]^2 \text{ if } \gamma_{LL} \leq S < \frac{\gamma_{LL} + \beta_{LL}}{2}$$
$$= 1 - \left(2 * \left[\frac{S - \gamma_{LL}}{\beta_{LL} - \gamma_{LL}}\right]^2\right) \text{ if } \frac{\gamma_{LL} + \beta_{LL}}{2} \leq S < \beta_{LL}$$
$$= 0.0 \text{ if } S < \gamma_{LL},$$

Using these weights, a linear combination of the scale factors (equations (14) and (19)) with the coefficients being the weights as derived in equations (20)-(23) are used to make the final adjustments to each color channel at the color balance computations block 110 of FIG. 4.

As stated above, one aspect of the present invention is the automatic mechanism to color-balance an image. This automatic mechanism at block 422 of FIG. 4 adjusts the anchor points ($\alpha_{IL}$, $\beta_{IL}$, $\gamma_{IL}$, $\alpha_{LL}$, $\beta_{LL}$, and $\gamma_{LL}$) on the fuzzy membership functions illustrated in FIG. 6 for each image based on image 102 statistics. To adjust the membership functions automatically, the present invention further defines parameters $\beta_{R0}^{max}$ and $\beta_{R0}^{min}$, which represent the maximum and minimum values of $\beta_{LL}$. These parameters correspond to the Localized Luminance (LL) measures, and thus depend upon the brightest pixel intensity (closer to white). These parameters compute as follows:

$$\beta_{R0}^{max} = \xi_1 S_{max}, \quad (25)$$

$$\beta_{R0}^{min} = \xi_2 S_{max}, \text{ and} \quad (26)$$

where $\xi_1$ and $\xi_2$ are two fixed constants. It is only important that $\xi_1 > \xi_2$. In the particular example discussed here, for example, the present invention sets $\xi_1 = 5/6$ and $\xi_2 = 1/2$. Another parameter needed for these calculations is the percentage of pixels connected to the brightest pixels, computed at block 424 of FIG. 4, using the following equation:

$$P = (\text{Brightest Pixels}/N), \qquad (27)$$

where P represents the percentage of the pixels in the image connected to the brightest pixels (located in set L as described above), and which are also very bright (within 5% of the brightest intensity as a non-limiting example), and where N represents the total number of pixels in the image. Therefore, after block 422 computes its respective weights, the weights are provided to block 426, along with P from block 424 (equation (27) above) to compute $\beta_{LL}$. The parameter $\beta_{LL}$ computed at block 426 of FIG. 4 is dependent on the Localized Luminescence (LL) measure characteristics of the image. In this example, the value of $\beta_{LL}$ is modified based on the degree of brightness content in the image (using a linear model based on P of equation 27). This formulates as follows:

$$\beta_{LL} = \frac{(100N\beta_{R0}^{max} - 100\beta_{R0}^{max}) - (NP - 100)(\beta_{R0}^{max} - \beta_{R0}^{min})}{(100N - 100)}. \qquad (28)$$

The computed value of $\beta_{LL}$ at block 426 is received by block 428, including a manually adjusted parameter $\delta$ from block 112 (described in detail below), where additional constraints are applied to the remaining parameters of the fuzzy membership functions:

$$\gamma_{IL} = \beta_{LL}; \gamma_{LL} = \beta_{IL} \qquad (29)$$

and $$\frac{\beta_{LL}}{\beta_{IL}} = \delta. \qquad (30)$$

The only requirement here is that in equation (30), $\delta \geq 1.0$, where $\delta$ represents the difference between the two hypotheses. Hence, the relationship illustrated in equation (29) is optional. That is, $\beta_{IL} \neq \beta_{LL}$, $\gamma_{LL} \neq \beta_{IL}$ is also possible. Higher values of $\delta$ (manually selected at block 112) allow for more separability between the two hypotheses. In aspect, for example, $\delta$ is set equal to 5.0. Thus, on an image basis the various control points of the fuzzy membership functions can be adjusted. This allows for an adaptive adjustment of the weighting parameters to achieve automatic color balancing. The $\delta$ adjustment may be either a software or hardware-based implementation that enables users to vary the value of $\delta$ before a picture is taken. A software implementation may, as a non-limiting example, be in the form of a software plug-in and the hardware implementation may be in the form of electronics in a digital camera. Block 430 receives the computations from blocks 424 and 428 to calculate the Image-Wide Luminance weight $W_{IL}$ and Localized Luminance weight $W_{LL}$. The resulting calculated weights at block 430 are then provided to the color balance computation block 110 for further processing.

(d) Color Balance Computations Module

In the color balance computations block 110, the ILS factors 410, the LLS factors 412 and the weights $W_{IL}$ and $W_{LL}$ computed at block 430 are received and are used to generate a set of color balance factors. The operator 450 multiplies the Image-Wide Luminance weight $W_{IL}$ by the ILS factor 410 and the operator 456 multiplies the Localized Luminance weight $W_{LL}$ by the LLS factor 412, and the operator 452 sums the two resulting products to generate a set of color balance factors. These are then provided for the construction of the new color balanced output image 114 by the operator 454 by multiplying these results with the image pixels from the original image 102 (the directed line 438 illustrated in FIG. 4). As one specific example, the color adjustment to each pixel for the red channel becomes:

$$R_{NEW} = R_{current} * (W_{IL} * ILS_{IL} + W_{LL} * LLS_{LL}) \qquad (24)$$

where $R_{Current}$ and $R_{new}$ are the red channel values for a given pixel in the original and the color-balanced images, respectively. Solutions to equation (24) are calculated on a pixel-basis because the weights $\{W_{IL}, W_{LL}\}$ and the S values vary based on the color channel values at each pixel. Similar equations are used at each pixel for any channel, e.g. the green and blue channels.

(6) Results

Figure 7:
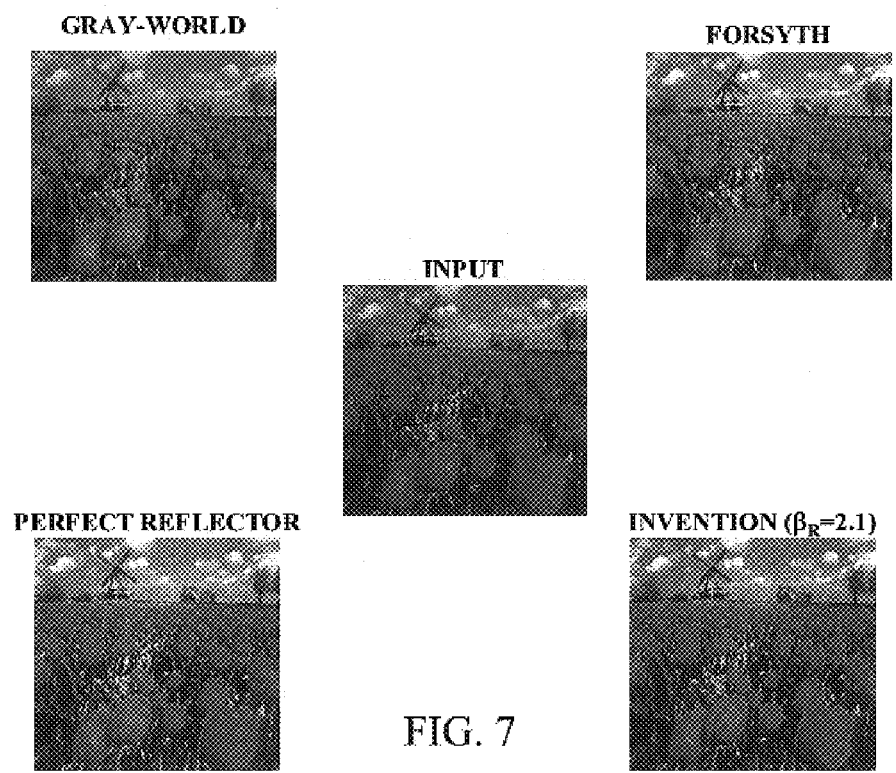
FIG. 7 is an exemplary comparison of the color-balancing algorithms for a tulip scene in accordance with the present invention.

In order to reduce this invention to practice, its performance has been tested on images collected using a digital camera. The careful selection of these images highlights various colors balancing problems. The first example is an image of some tulips on a farm. The original image as seen in FIG. 7 has a severe magenta cast. The image, after correction using the Gray-World assumption, no longer has the magenta cast. However, the algorithm over-compensates at the brighter regions of the image, causing the sky to appear unacceptably greenish. It also suppresses the reds of the tulips to such a large degree that the tulips are brownish and dull. Using the Perfect-Reflector assumption, magenta was removed from the sky and, as a result, the clouds in the image appeared white. However, the magenta cast still pervades much of the rest of the image. The Forsyth algorithm performs better than the Gray-World and Perfect-Reflector algorithms. However, the magenta is not completely removed from the sky (appears dark blue) or the tulips that appear too reddish. Using the adaptive color-balancing algorithm, the present invention obtained considerable improvements. All results list the adaptive setting for $\beta_{PR}$. The sky is a perfect blue, and the green stalks, overwhelmed by the magenta in the original image, now appear distinctly green. The red tones of the tulips appear less drowned by the magenta color and thus appear more true red.

Figure 8:
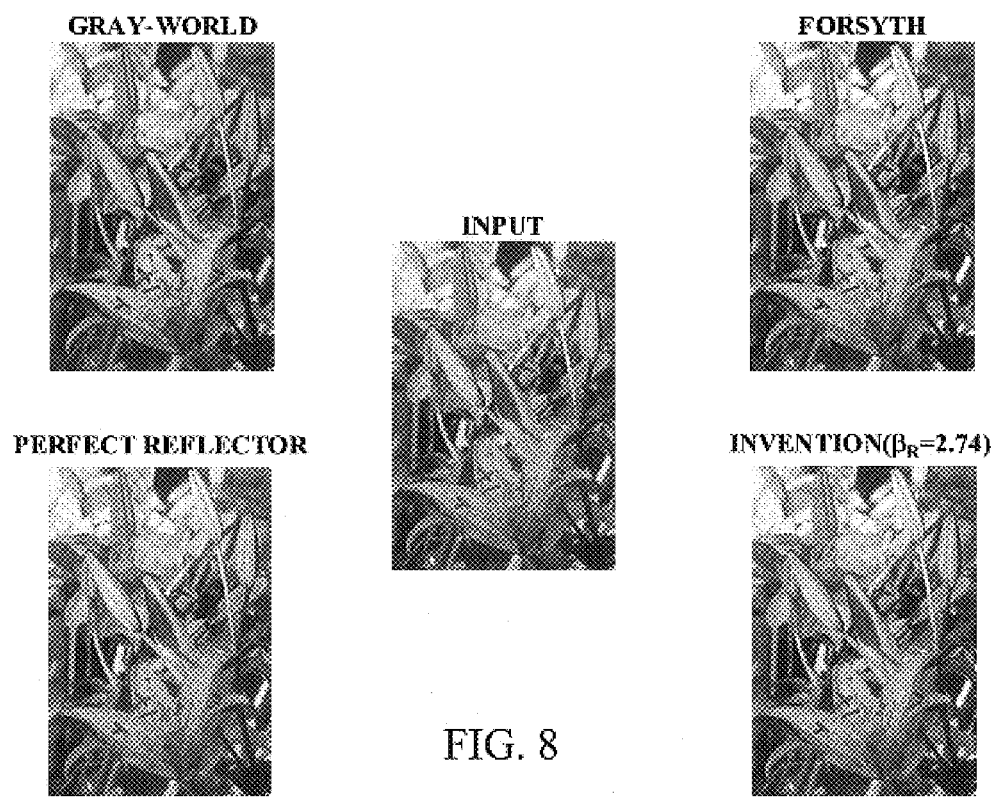
FIG. 8 is an exemplary comparison of the color-balancing algorithms for a lily scene in accordance with the present invention.
Figure 9:
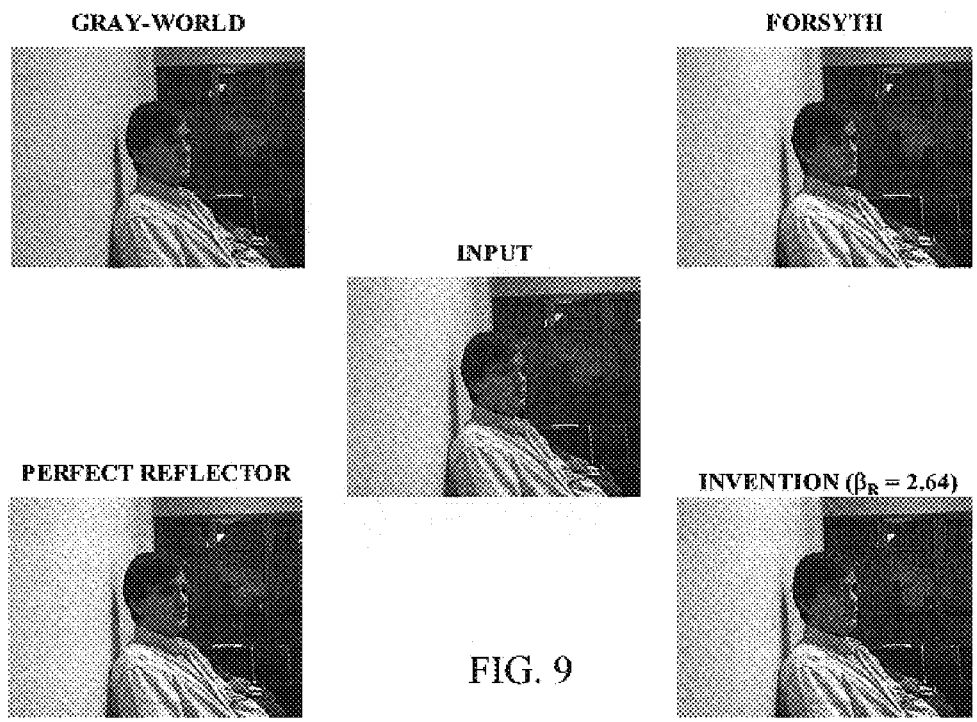
FIG. 9 is an exemplary comparison of the color-balancing algorithms for an indoor scene in accordance with the present invention.
Figure 10:
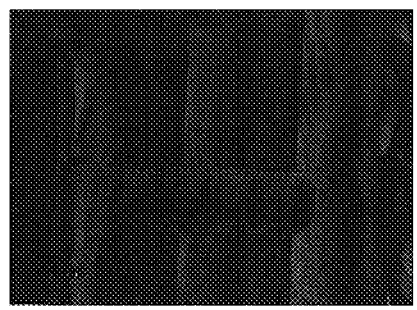
FIG. 10 is an exemplary performance comparison of the invention for cloth scenes under severe blue and red color contamination in accordance with the present invention.
Figure 10:
Figure 10:
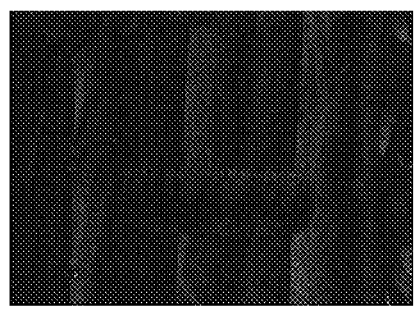
Figure 10:
Figure 11:
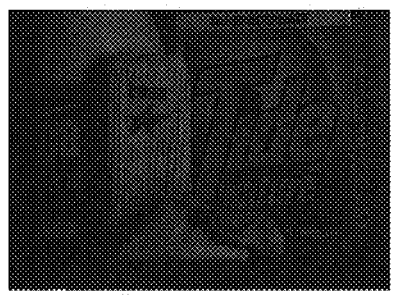
FIG. 11 is an exemplary performance comparison of the invention for scenes under severe blue and red color contamination for plastic, and wool and plastic objects in accordance with the present invention.
Figure 11:
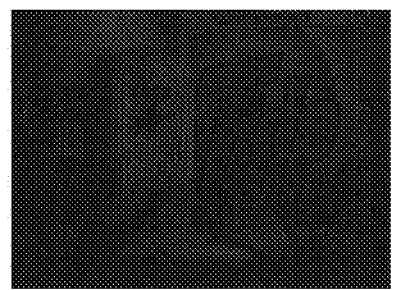
Figure 11:
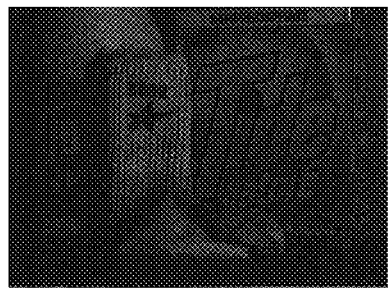
Figure 11:
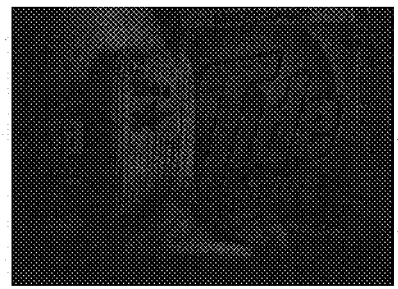
Figure 12:
FIG. 12 is an exemplary performance comparison of the invention for scenes under severe blue and red color contamination for glass and metallic objects in accordance with the present invention.
Figure 12:
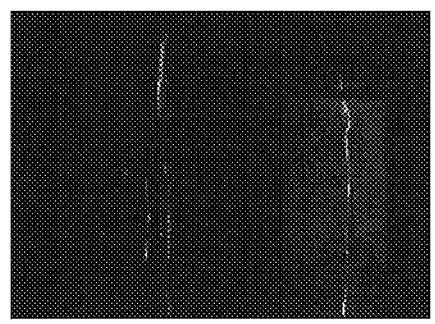
Figure 12:
Figure 12:
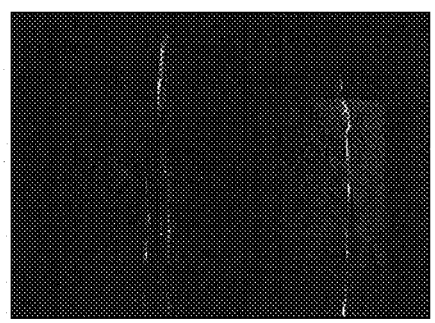

In the case of lily example as shown in FIG. 8, there is very little blue in the image. The Gray-World algorithm attempts to equalize the blue average with the reds and greens results in an image that is unacceptably dark. The Perfect-Reflector assumption does not affect this image very much because the bright spots along the glossy stalks are small and almost white. The Forsyth algorithm also suffers from the same effect as the Gray-World albeit a little less severe. The present invention performed the better than the other techniques. It removed the extra yellow in the image without unnecessary boosting of the blue channel. The image in FIG. 9 has a strong greenish-yellow cast. Again, the Gray-World assumption fares poorly because of the lack of blue in the object forcing the subject to take an unnatural blue cast. The Perfect-Reflector seems to have little effect on the image because the brightest region, which is the reflection of the fluorescent lighting on the glass, is particularly saturated at white and small in size. In the Forsyth algorithm, the performance is better as the yellow cast is gone and the wall now appears white. However, the algorithm has the negative side effect of de-saturating the yellow from the subject's shirt well. The present invention performed comparably with the Forsyth without washing away the yellow from the subject's shirt. The performance of the present invention was also studied with respect for objects of different materials under two extreme colored lighting conditions. FIG. 10 shows a Mondrian type image of a colorful shirt taken under the two extreme lighting conditions. The results of the color balancing using the algorithm of the present invention ($\beta_{PR}$=2.9) show a considerable improvement to the color content of the shirt and the consistency in the output for two different lighting conditions. Similar results can be seen for the two different material sets as shown in FIG. 11 ($\beta_{PR}$=2.5) and FIG. 12 ($\beta_{PR}$=2.27). These results show how robust the color-balancing algorithm of the present invention is to various conditions.

Although the invention has been described in language specific to structural features and or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for automatic color balancing in digital images on a data processing system comprising acts of:
   receiving a current color image into a data processing system;
   providing a set of Image-Wide Luminance (IL) factors based on the entire current color image;
   providing a set of Localized Luminance (LL) factors based on the current color image;
   computing a set of weights representing a combination application of the IL factors and the LL factors;
   computing a set of color balance factors, where each color balance factor is computed from the IL factors, the LL factors, and the weights; and
   constructing a new color image using the set of color balance factors and the current color image; and
   wherein the act of computing the set of color balance factors comprises multiplying the IL factors with IL weights to generate IL balance factors and multiplying the LL factors with LL weights to generate LL balance factors, and adding the IL balance factors with the LL balance factors to generate the set of color balance factors.

2. A method for automatic color balancing as set forth in claim 1, wherein the weights are computed as a function of luminance.

3. A method for automatic color balancing as set forth in claim 2, wherein the weights are generated from fuzzy membership functions each having a plurality of anchor points.

4. A method for automatic color balancing as set forth in claim 3, wherein each fuzzy membership function has a maximum-weight anchor point and a minimum-weight anchor point with a sloped set of values connecting the maximum-weight anchor point with the minimum-weight anchor point.

5. A method for automatic color balancing as set forth in claim 4, wherein the set of weights comprises IL weights and LL weights.

6. A method for automatic color balancing as set forth in claim 5, wherein an IL fuzzy membership function and a LL fuzzy membership function are separated by a ratio comprised of an LL fuzzy membership function maximum-weight anchor point to an IL fuzzy membership function maximum-weight anchor point.

7. A method for automatic color balancing as set forth in claim 6, wherein the ratio is at least one.

8. A method for automatic color balancing as set forth in claim 7, wherein the IL weights are obtained from the fuzzy membership function:

$$W_{IL} = 1.0 \text{ if } S < \beta_{IL}$$
$$= 1.0 - \frac{(S - \beta_{IL})}{(\gamma_{IL} - \beta_{IL})} \text{ if } \beta_{IL} \leq S \leq \gamma_{IL}, \text{ where}$$
$$= 0.0 \text{ if } S > \gamma_{IL}$$

$W_{IL}$ represents an IL weight;

S represents image-wide average luminance;

$\beta_{IL}$ represents a maximum-weight anchor point in the fuzzy membership function; and $\gamma_{IL}$ represents a minimum-weight anchor point of the fuzzy membership function.

9. A method for automatic color balancing as set forth in claim 8, wherein the LL weights are obtained from the fuzzy membership function $$W_{LL} = 1.0 \text{ if } S > \beta_{LL}$$
$$= \frac{(S - \gamma_{LL})}{(\beta_{LL} - \gamma_{LL})} \text{ if } \gamma_{LL} \leq S \leq \beta_{LL}, \text{ where}$$
$$= 0.0 \text{ if } S < \gamma_{LL}$$

$W_{LL}$ represents an LL weight;

S represents image-wide average luminance;

$\beta_{LL}$ represents a maximum-weight anchor point in the fuzzy membership function; and $\gamma_{LL}$ represents a minimum-weight anchor point of the fuzzy membership function.

10. A method for automatic color balancing as set forth claim 9, wherein the act of constructing a new color image comprises multiplying the current color image by the set of color balance factors.

11. A method for automatic color balancing as set forth claim 10, wherein the act of providing a set of IL factors based on the current color image comprises an act of computing the IL factors based on the current color image.

12. A method for automatic color balancing as set forth in claim 11, wherein the current color image comprises a set of pixels p, with each pixel p including a plurality of color channels X, and wherein the act of computing IL factors based on the current color image is performed by:
   computing an average intensity value $A_X$ for each channel X by summing an intensity for a single channel X at each pixel p in the image and dividing by the number of pixels in the image in accordance to:

$$A_X = \left(\sum_{i=1}^{p} X_i\right)/p;$$

and computing an overall average image intensity value A by summing the average intensity value $A_X$ for all channels and dividing by a total number of channels in accordance to:

$$A = \frac{\sum_{i=1}^{m} A_{X_i}}{m}$$

where m represents the total number of channels;
computing a set of IL factors where the IL factor for each channel is computed from:

$$IL_X = \frac{A}{A_X}.$$

13. A method for automatic color balancing as set forth claim 12, wherein the act of providing a set of LL factors based on the current color image comprises an act of computing LL factors.

14. A method for automatic color balancing as set forth claim 13, further comprising selecting a color space for each pixel p, wherein the color space includes the plurality of color channels X for that pixel p.

15. A method for automatic color balancing as set forth claim 14, wherein the color space is selected from a group consisting of: RGB, CMYK, YIQ, YUV, HSB, HSL, and HSV.

16. A method for automatic color balancing as set forth claim 15, wherein the channels X for a particular space are normalized between 0.0 and 1.0.

17. A method for automatic color balancing as set forth claim 16, wherein the act of computing LL factors comprises:
   determining a maximum luminance pixel for each channel X;
   identifying pixels surrounding the maximum luminance pixel; and
   denoting a maximum luminance point with the maximum luminance pixel and the pixels surrounding the maximum pixel.

18. A method for automatic color balancing as set forth claim 17, wherein the LL factors are computed from a luminance in the channel X at the maximum luminance point as follows:

$$LL_X = \frac{1.0}{S_X},$$

where:
   $S_X$ is the luminance in channel X.

19. A method for automatic color balancing as set forth in claim 1, wherein the weights are generated from fuzzy membership functions each having a plurality of anchor points.

20. A method for automatic color balancing as set forth in claim 19, wherein each fuzzy membership function has a maximum-weight anchor point and a minimum-weight anchor point with a sloped set of values connecting the maximum-weight anchor point with the minimum-weight anchor point.

21. A method for automatic color balancing as set forth in claim 20, wherein an IL fuzzy membership function and a LL fuzzy membership function are separated by a ratio comprised of an LL fuzzy membership function maximum-weight anchor point to an IL fuzzy membership function maximum-weight anchor point.

22. A method for automatic color balancing as set forth in claim 21, wherein the ratio is at least one.

23. A method for automatic color balancing as set forth in claim 1, wherein the set of weights comprises IL weights and LL weights.

24. A method for automatic color balancing as set forth in claim 23, wherein the IL weights are obtained from a fuzzy membership function:

$$W_{IL} = 1.0 \text{ if } S < \beta_{IL}$$
$$= 1.0 - \frac{(S - \beta_{IL})}{(\gamma_{IL} - \beta_{IL})} \text{ if } \beta_{IL} \leq S \leq \gamma_{IL}, \text{ where}$$
$$= 0.0 \text{ if } S > \gamma_{IL}$$

$W_{IL}$ represents an IL weight;
S represents image-wide average luminance;
$\beta_{IL}$ represents a maximum-weight anchor point in the fuzzy membership function; and
$\beta_{IL}$ represents a minimum-weight anchor point of the fuzzy membership function.

25. A method for automatic color balancing as set forth in claim 23, wherein the LL weights are obtained from a fuzzy membership function $$W_{LL} = 1.0 \text{ if } S > \beta_{LL}$$
$$= \frac{(S - \gamma_{LL})}{(\beta_{LL} - \gamma_{LL})} \text{ if } \gamma_{IL} \leq S \leq \beta_{IL}, \text{ where}$$
$$= 0.0 \text{ if } S < \gamma_{LL}$$

$W_{LL}$ represents an LL weight;
S represents image-wide average luminance;
$\beta_{LL}$ represents a maximum-weight anchor point in the fuzzy membership function; and
$\gamma_{LL}$ represents a minimum-weight anchor point of the fuzzy membership function.

26. A method for automatic color balancing as set forth in claim 23, wherein the IL weights are obtained from a fuzzy membership function:

$$W_{IL} = 1.0 \text{ if } S < \beta_{IL}$$
$$= 2 * \left[\frac{S - \beta_{IL}}{\gamma_{IL} - \beta_{IL}}\right]^2 \text{ if } \beta_{IL} \leq S < \frac{\gamma_{IL} + \beta_{IL}}{2}$$
$$= 1 - \left(2 * \left[\frac{S - \beta_{IL}}{\gamma_{IL} - \beta_{IL}}\right]^2\right) \text{ if } \frac{\gamma_{IL} + \beta_{IL}}{2} \leq S < \gamma_{IL}$$
$$= 0.0 \text{ if } S > \gamma_{IL}$$

where $W_{IL}$ represents an IL weight;
S represents image-wide average luminance;
$\beta_{IL}$ represents a maximum-weight anchor point in the fuzzy membership function; and
$\gamma_{IL}$ represents a minimum-weight anchor point of the fuzzy membership function.

27. A method for automatic color balancing as set forth in claim 23, wherein the LL weights are obtained from a fuzzy membership function $$W_{LL} = 1.0 \text{ if } S > \beta_{LL}$$
$$= 2 * \left[\frac{S - \gamma_{LL}}{\beta_{LL} - \gamma_{LL}}\right]^2 \text{ if } \gamma_{LL} \leq S < \frac{\gamma_{LL} + \beta_{LL}}{2}$$
$$= 1 - \left(2 * \left[\frac{S - \gamma_{LL}}{\beta_{LL} - \gamma_{LL}}\right]^2\right) \text{ if } \frac{\gamma_{LL} + \beta_{LL}}{2} \leq S < \beta_{LL}$$
$$= 0.0 \text{ if } S < \gamma_{LL}$$

where $W_{LL}$ represents an LL weight;

S represents image-wide average luminance;

$\beta_{LL}$ represents a maximum-weight anchor point in the fuzzy membership function; and $\gamma_{LL}$ represents a minimum-weight anchor point of the fuzzy membership function.

28. A method for automatic color balancing as set forth claim 1, wherein the act of constructing a new color image comprises multiplying the current color image by the set of color balance factors.

29. A method for automatic color balancing as set forth claim 1, wherein the act of providing a set of IL factors based on the current color image comprises an act of computing the IL factors based on the current color image.

30. A method for automatic color balancing as set forth in claim 29, wherein the current color image comprises a set of pixels p, with each pixel p including a plurality of color channels X, and wherein the act of computing IL factors based on the current color image is performed by:

computing an average intensity value $A_X$ for each channel X by summing an intensity for a single channel X at each pixel p in the current image and dividing by a number of pixels in the current image in accordance to:

$$A_X = \left(\sum_{i=1}^{p} X_i\right)/p;$$

and computing an overall average image intensity value A by summing the average intensity value $A_X$ for all channels and dividing by a total number of channels in accordance to:

$$A = \frac{\sum_{i=1}^{m} A_{X_i}}{m}$$

where m represents the total number of channels;

computing a set of IL factors where the IL factor for each channel is computed from:

$$IL_X = \frac{A}{A_X}.$$

31. A method for automatic color balancing as set forth claim 1, wherein the act of providing a set of LL factors based on the current color image comprises an act of computing LL factors.

32. A method for automatic color balancing as set forth claim 31, further comprising selecting a color space for each pixel p, wherein the color space includes the plurality of color channels X for that pixel p.

33. A method for automatic color balancing as set forth claim 32, wherein the color space is selected from a group consisting of: RGB, CMYK, YIQ, YUV, HSB, HSL, and HSV.

34. A method for automatic color balancing as set forth claim 33, wherein the channels X for a particular space are normalized between 0.0 and 1.0.

35. A method for automatic color balancing as set forth claim 32, wherein the act of computing LL factors comprises:

determining a maximum luminance pixel for each channel X;

identifying pixels surrounding the maximum luminance pixel; and denoting a maximum luminance point with the maximum luminance pixel and the pixels surrounding the maximum pixel.

36. A method for automatic color balancing as set forth claim 35, wherein the LL factors are computed from a luminance in the channel X at the maximum luminance point as follows:

$$LL_X = \frac{1.0}{S_X},$$

where:

$S_X$ is the luminance in channel X.

37. A computer program product for automatic color balancing in digital images on a data processing system, the computer program product comprising a computer-readable medium having computer program instructions stored therein for causing a computer to perform operations of:

receiving a current color image into a data processing system;

providing a set of Image-Wide Luminance (IL) factors based on the entire current color image;

providing a set of Localized Luminance (LL) factors based on the current color image;

computing a set of weights representing a combination application of the IL factors and the LL factors;

computing a set of color balance factors, where each color balance factor is computed from the IL factors, the LL factors, and the weights; and constructing a new color image using the set of color balance factors and the current color image; and wherein the operation of computing the set of color balance factors comprises multiplying the IL factors with IL weights to generate IL balance factors and multiplying the LL factors with LL weights to generate LL balance factors, and adding the IL balance factors with the LL balance factors to generate the set of color balance factors.

38. The computer program product as set forth in claim 37, wherein the weights are computed as a function of luminance.

39. The computer program product as set forth in claim 37, wherein the weights are generated from fuzzy membership functions each having a plurality of anchor points.

40. The computer program product as set forth in claim 39, wherein each fuzzy membership function has a maximum-weight anchor point and a minimum-weight anchor point with a sloped set of values connecting the maximum-weight anchor point with the minimum-weight anchor point.

41. The computer program product as set forth in claim 40, wherein an IL fuzzy membership function and a LL fuzzy membership function are separated by a ratio comprised of an LL fuzzy membership function maximum-weight anchor point to an IL fuzzy membership function maximum-weight anchor point.

42. The computer program product as set forth in claim 41, wherein the ratio is at least one.

43. The computer program product as set forth in claim 37, wherein the set of weights comprises IL weights and LL weights.

44. The computer program product as set forth in claim 43, wherein the IL weights are obtained from a fuzzy membership function:

$$W_{IL} = 1.0 \text{ if } S < \beta_{IL}$$
$$= 1.0 - \frac{(S - \beta_{IL})}{(\gamma_{IL} - \beta_{IL})} \text{ if } \beta_{IL} \leq S \leq \gamma_{IL}, \text{ where}$$
$$= 0.0 \text{ if } S > \gamma_{IL}$$

$W_{IL}$ represents an IL weight;
S represents image-wide average luminance;
$\beta_{IL}$ represents a maximum-weight anchor point in the fuzzy membership function; and
$\gamma_{IL}$ represents a minimum-weight anchor point of the fuzzy membership function.

45. The computer program product as set forth in claim 43, wherein the LL weights are obtained from a fuzzy membership function $$W_{LL} = 1.0 \text{ if } S > \beta_{LL}$$
$$= \frac{(S - \gamma_{LL})}{(\beta_{LL} - \gamma_{LL})} \text{ if } \gamma_{LL} \leq S \leq \beta_{LL}, \text{ where}$$
$$= 0.0 \text{ if } S < \gamma_{LL}$$

$W_{LL}$ represents an LL weight;
S represents image-wide average luminance;
$\beta_{LL}$ represents a maximum-weight anchor point in the fuzzy membership function; and
$\gamma_{LL}$ represents a minimum-weight anchor point of the fuzzy membership function.

46. The computer program product as set forth in claim 43, wherein the IL weights are obtained from a fuzzy membership function:

$$W_{IL} = 1.0 \text{ if } S < \beta_{IL}$$
$$= 2 * \left[\frac{S - \beta_{IL}}{\gamma_{IL} - \beta_{IL}}\right]^2 \text{ if } \beta_{IL} \leq S < \frac{\gamma_{IL} + \beta_{IL}}{2}$$
$$= 1 - \left(2 * \left[\frac{S - \beta_{IL}}{\gamma_{IL} - \beta_{IL}}\right]^2\right) \text{ if } \frac{\gamma_{IL} + \beta_{IL}}{2} \leq S < \gamma_{IL}$$
$$= 0.0 \text{ if } S > \gamma_{IL}$$

where $W_{IL}$ represents an IL weight;
S represents image-wide average luminance;
$\beta_{IL}$ represents a maximum-weight anchor point in the fuzzy membership function; and
$\gamma_{IL}$ represents a minimum-weight anchor point of the fuzzy membership function.

47. The computer program product as set forth in claim 43, wherein the LL weights are obtained from a fuzzy membership function $$W_{LL} = 1.0 \text{ if } S > \beta_{LL}$$
$$= 2 * \left[\frac{S - \gamma_{LL}}{\beta_{LL} - \gamma_{LL}}\right]^2 \text{ if } \gamma_{LL} \leq S < \frac{\gamma_{LL} + \beta_{LL}}{2}$$
$$= 1 - \left(2 * \left[\frac{S - \gamma_{LL}}{\beta_{LL} - \gamma_{LL}}\right]^2\right) \text{ if } \frac{\gamma_{LL} + \beta_{LL}}{2} \leq S < \beta_{LL}$$
$$= 0.0 \text{ if } S < \gamma_{LL}$$

where $W_{LL}$ represents an LL weight;
S represents image-wide average luminance;
$\beta_{LL}$ represents a maximum-weight anchor point in the fuzzy membership function; and
$\gamma_{LL}$ represents a minimum-weight anchor point of the fuzzy membership function.

48. The computer program product as set forth claim 37, wherein the act of constructing a new color image comprises multiplying the current color image by the set of color balance factors.

49. The computer program product as set forth in claim 37, wherein the act of providing a set of IL factors based on the current color image comprises an act of computing the IL factors based on the current color image.

50. The computer program product as set forth in claim 49, wherein the current color image comprises a set of pixels p, with each pixel p including a plurality of color channels X, and wherein the act of computing IL factors based on the current color image is performed by:
computing an average intensity value $A_X$ for each channel X by summing an intensity for a single channel X at each pixel p in the current image and dividing by a number of pixels in the current image in accordance to:

$$A_X = \left(\sum_{i=1}^{P} X_i\right) / p;$$

and
computing an overall average image intensity value A by summing the average intensity value $A_X$ for all channels and dividing by a total number of channels in accordance to:

$$A = \frac{\sum_{i=1}^{m} A_{X_i}}{m}$$

where m represents the total number of channels;
computing a set of IL factors where the IL factor for each channel is computed from:

$$IL_X = \frac{A}{A_X}.$$

51. The computer program product as set forth claim 37, wherein the act of providing a set of LL factors based on the current color image comprises an act of computing LL factors.

52. The computer program product as set forth claim 51, further comprising selecting a color space for each pixel p, wherein the color space includes the plurality of color channels X for that pixel p.

53. The computer program product as set forth claim 52, wherein the color space is selected from a group consisting of: RGB, CMYK, YIQ, YUV, HSB, HSL, and HSV.

54. The computer program product as set forth claim 53, wherein the channels X for a particular space are normalized between 0.0 and 1.0.

55. The computer program product as set forth claim 52, wherein the act of computing LL factors comprises:
 determining a maximum luminance pixel for each channel X;
 identifying pixels surrounding the maximum luminance pixel; and
 denoting a maximum luminance point with the maximum luminance pixel and the pixels surrounding the maximum pixel.

56. The computer program product as set forth claim 55, wherein the LL factors are computed from a luminance in the channel X at the maximum luminance point as follows:

$$LL_X = \frac{1.0}{S_X},$$

where:
 $S_X$ is the luminance in channel X.

57. An apparatus for automatic color balancing in digital images on a data processing system, comprising:
 an input for receiving a current color image into a data processing system;
 a first module providing a set of Image-Wide Luminance (IL) factors based on the entire current color image;
 a second module providing a set of Localized Luminance (LL) factors based on the current color image;
 a third module computing a set of weights representing a combination application of the IL factors and the LL factors;
 a fourth computing a set of color balance factors, where each color balance factor is computed from the IL factors, the LL factors, and the weights, and constructing a new color image using the set of color balance factors and the current color image; and
 wherein the fourth module computes the set of color balance factors by multiplying the IL factors with IL weights to generate IL balance factors and by multiplying the LL factors with LL weights to generate LL balance factors, and adding the IL balance factors with the LL balance factors to generate the set of color balance factors.

58. The apparatus as set forth in claim 57, wherein the weights are computed as a function of luminance.

59. The apparatus as set forth in claim 57, wherein weights are generated from fuzzy membership functions each having a plurality of anchor points.

60. The apparatus as set forth in claim 59, wherein each fuzzy membership function has a maximum-weight anchor point and a minimum-weight anchor point with a sloped set of values connecting the maximum-weight anchor point with the minimum-weight anchor point.

61. The apparatus as set forth in claim 60, wherein an IL fuzzy membership function and a LL fuzzy membership function are separated by a ratio comprised of an LL fuzzy membership function maximum-weight anchor point to an IL fuzzy membership function maximum-weight anchor point.

62. The apparatus as set forth in claim 61, wherein the ratio is at least one.

63. The apparatus as set forth in claim 57, wherein the set of weights comprises IL weights and LL weights.

64. The apparatus as set forth in claim 63, wherein the IL weights are obtained from a fuzzy membership function:

$$W_{IL} = 1.0 \text{ if } S < \beta_{IL}$$
$$= 1.0 - \frac{(S - \beta_{IL})}{(\gamma_{IL} - \beta_{IL})} \text{ if } \beta_{IL} \leq S \leq \gamma_{IL}, \text{ where}$$
$$= 0.0 \text{ if } S > \gamma_{IL}$$

$W_{IL}$ represents an IL weight;

S represents image-wide average luminance;

$\beta_{IL}$ represents a maximum-weight anchor point in the fuzzy membership function; and $\gamma_{IL}$ represents a minimum-weight anchor point of the fuzzy membership function.

65. The apparatus as set forth in claim 63, wherein the LL weights are obtained from a fuzzy membership function $$W_{LL} = 1.0 \text{ if } S > \beta_{LL}$$
$$= \frac{(S - \gamma_{LL})}{(\beta_{LL} - \gamma_{LL})} \text{ if } \gamma_{LL} \leq S \leq \beta_{LL}, \text{ where}$$
$$= 0.0 \text{ if } S < \gamma_{LL}$$

$W_{LL}$ represents an LL weight;

S represents image-wide average luminance;

$\beta_{LL}$ represents a maximum-weight anchor point in the fuzzy membership function; and $\gamma_{LL}$ represents a minimum-weight anchor point of the fuzzy membership function.

66. The apparatus as set forth in claim 63, wherein the IL weights are obtained from a fuzzy membership function:

$$W_{IL} = 1.0 \text{ if } S < \beta_{IL}$$
$$= 2*\left[\frac{S - \beta_{IL}}{\gamma_{IL} - \beta_{IL}}\right]^2 \text{ if } \beta_{IL} \leq S < \frac{\gamma_{IL} + \beta_{IL}}{2}$$
$$= 1 - \left(2*\left[\frac{S - \beta_{IL}}{\gamma_{IL} - \beta_{IL}}\right]^2\right) \text{ if } \frac{\gamma_{IL} + \beta_{IL}}{2} \leq S < \gamma_{IL}$$
$$= 0.0 \text{ if } S > \gamma_{IL}$$

where $W_{IL}$ represents an IL weight;

S represents image-wide average luminance;

$\beta_{IL}$ represents a maximum-weight anchor point in the fuzzy membership function; and $\gamma_{IL}$ represents a minimum-weight anchor point of the fuzzy membership function.

67. The apparatus as set forth in claim 63, wherein the LL weights are obtained from a fuzzy membership function $$W_{LL} = 1.0 \text{ if } S > \beta_{LL}$$

$$= 2*\left[\frac{S-\gamma_{LL}}{\beta_{LL}-\gamma_{LL}}\right]^2 \text{ if } \gamma_{LL} \leq S < \frac{\gamma_{LL}+\beta_{LL}}{2}$$

$$= 1-\left(2*\left[\frac{S-\gamma_{LL}}{\beta_{LL}-\gamma_{LL}}\right]^2\right) \text{ if } \frac{\gamma_{LL}+\beta_{LL}}{2} \leq S < \beta_{LL}$$

$$= 0.0 \text{ if } S < \gamma_{LL}$$

where $W_{LL}$ represents an LL weight;

S represents image-wide average luminance;

$\beta_{LL}$ represents a maximum-weight anchor point in the fuzzy membership function; and $\gamma_{LL}$ represents a minimum-weight anchor point of the fuzzy membership function.

68. The apparatus as set forth claim 57, wherein the fourth module further constructs a new color image by multiplying the current color image by the set of color balance factors.

69. The apparatus as set forth claim 57, wherein the first module provides a set of IL factors based on the current color image by computing the IL factors based on the current color image.

70. The apparatus as set forth in claim 69, wherein the current color image comprises a set of pixels p, with each pixel p including a plurality of color channels X, and wherein an act of computing IL factors based on the current color image is performed by:

computing an average intensity value $A_X$ for each channel X by summing an intensity for a single channel X at each pixel p in the current image and dividing by a number of pixels in the current image in accordance to:

$$A_X = \left(\sum_{i=1}^{p} X_i\right)/p;$$

and computing an overall average image intensity value A by summing the average intensity value $A_X$ for all channels and dividing by a total number of channels in accordance to:

$$A = \frac{\sum_{i=1}^{m} A_{X_i}}{m}$$

where m represents the total number of channels;

computing a set of IL factors where the IL factor for each channel is computed from:

$$IL_X = \frac{A}{A_X}.$$

71. The apparatus as set forth claim 57, wherein the second module provides a set of LL factors based on the current color image by computing LL factors.

72. The apparatus as set forth claim 71, further comprising selecting a color space for each pixel p, wherein the color space includes the plurality of color channels X for that pixel p.

73. The apparatus as set forth claim 72, wherein the color space is selected from a group consisting of: RGB, CMYK, YIQ, YUV, HSB, HSL, and HSV.

74. The apparatus as set forth claim 73, wherein the channels X for a particular space are normalized between 0.0 and 1.0.

75. The apparatus as set forth claim 72, wherein LL factors compute by:

determining a maximum luminance pixel for each channel X;

identifying pixels surrounding the maximum luminance pixel; and denoting a maximum luminance point with the maximum luminance pixel and the pixels surrounding the maximum pixel.

76. The apparatus as set forth claim 75, wherein the LL factors are computed from a luminance in the channel X at the maximum luminance point as follows:

$$LL_X = \frac{1.0}{S_X},$$

where:

$S_X$ is the luminance in channel X.

77. The apparatus as set forth claim 57, where the first module, the second module, the third module, and the fourth module are software implemented.

78. The apparatus as set forth claim 57, where the first module, the second module, the third module, and the fourth module are hardware implemented.

79. The apparatus as set forth claim 57, where the first module, the second module, the third module, and the fourth module are combinations of both hardware and software implementations.

\* \* \* \* \*